Dec. 25, 1962 C. BAUR ET AL 3,070,389
STRUCTURE FOR REMOVABLY CONNECTING A DEVICE
TO A SUPPORT THEREFOR
Filed March 9, 1959 3 Sheets-Sheet 1
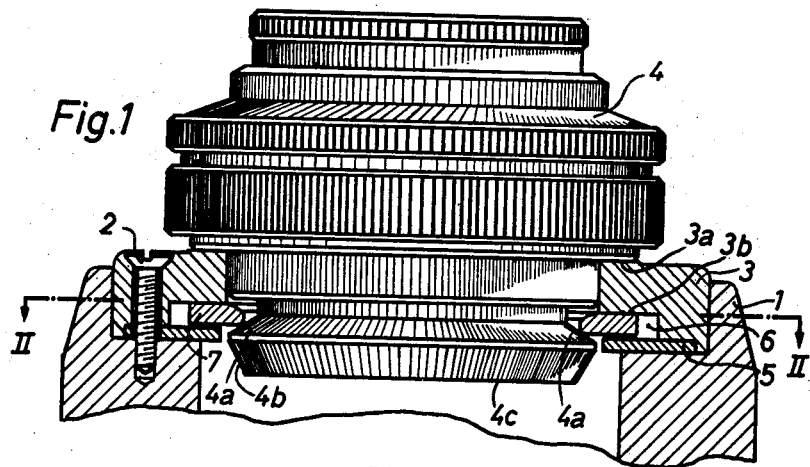
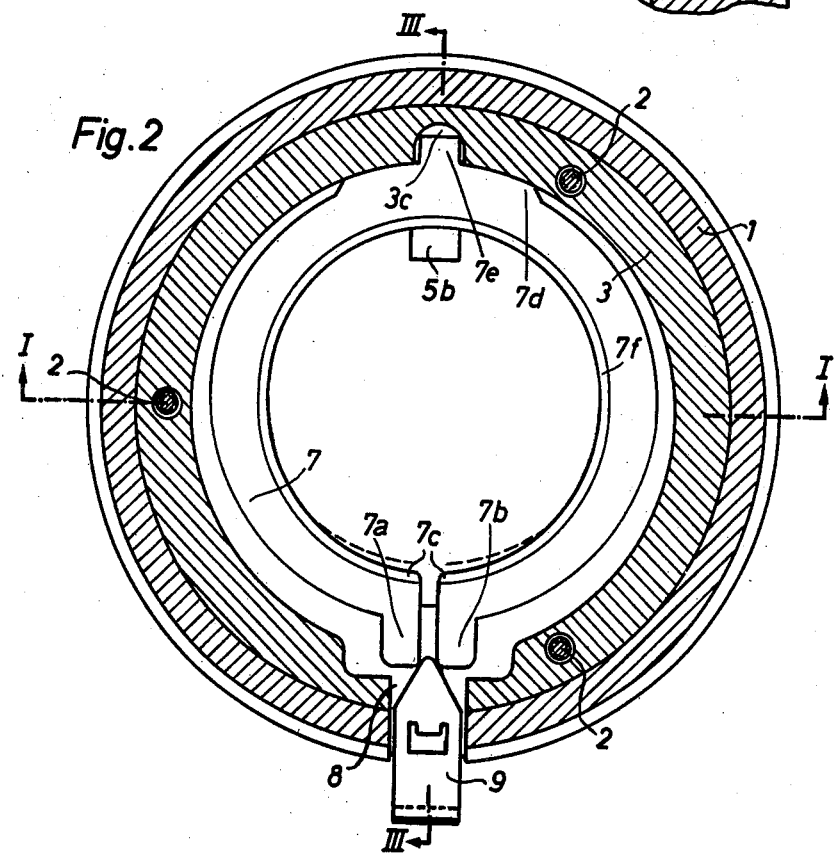
INVENTOR.
CARL BAUR
ERICH BURGER
JOACHIM NÖTZEL
BY
Michael S. Striker
Atty.

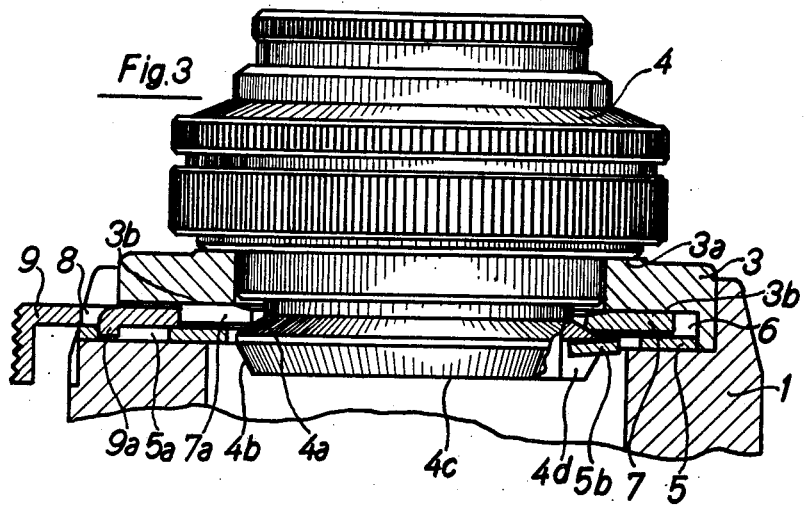
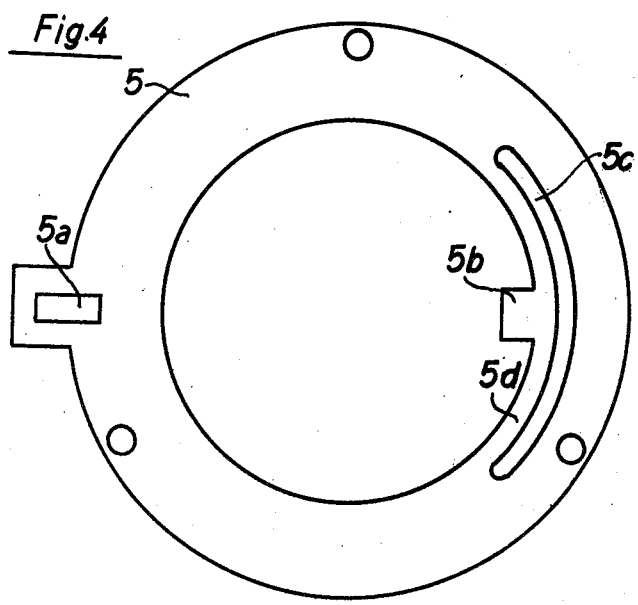

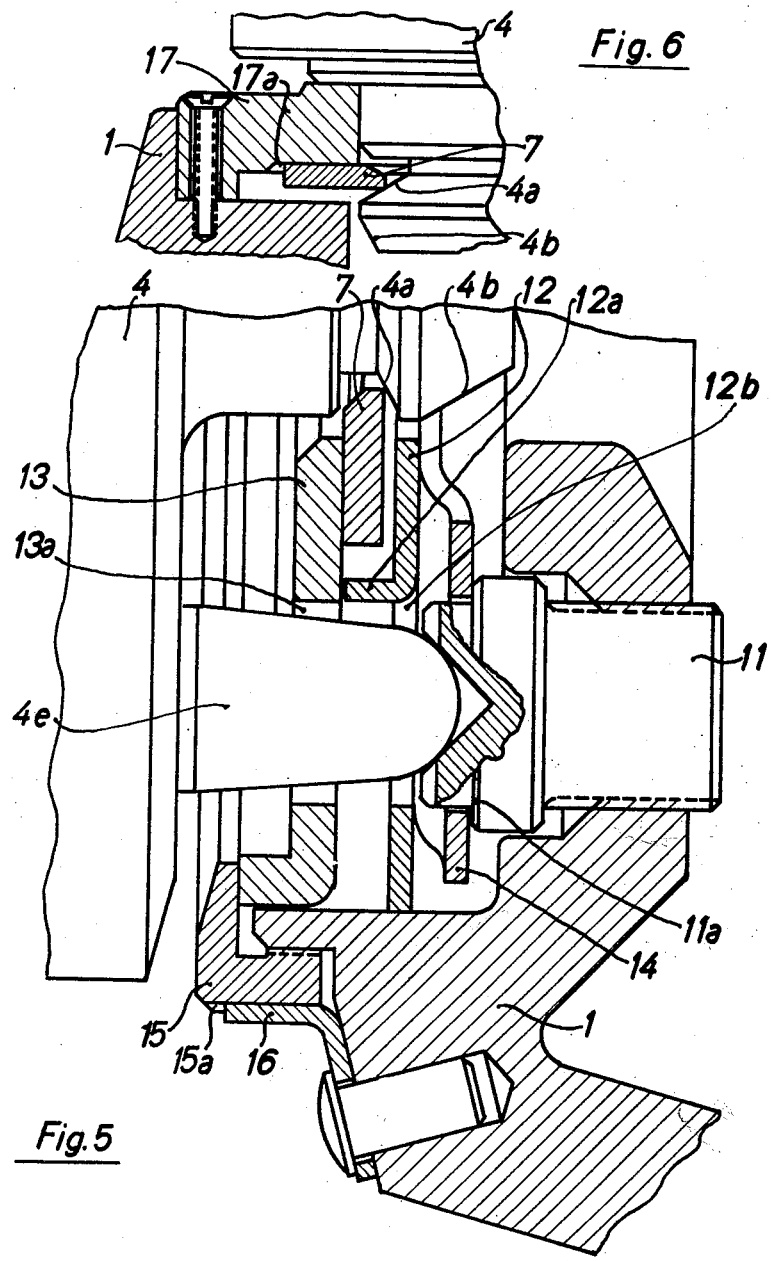

United States Patent Office 3,070,389
Patented Dec. 25, 1962

3,070,389
STRUCTURE FOR REMOVABLY CONNECTING A DEVICE TO A SUPPORT THEREFOR
Carl Baur, Baldham, near Munich, and Erich Burger and Joachim Notzl, Munich, Germany, assignors to Firma Agfa Aktiengesellschaft, Leverkusen-Bayerwerk, Germany
Filed Mar. 9, 1959, Ser. No. 798,287
Claims priority, application Germany Sept. 14, 1956
13 Claims. (Cl. 287—20.5)

The present invention relates to releasable connecting arrangements, and is a continuation-in-part of Serial No. 682,777, filed September 9, 1957, and now abandoned.

More particularly, the present invention relates to connecting arrangements where a device is releasably connected to another device or a suitable support. For example, the present invention is adaptable to the connection of an objective assembly releasably with a camera housing.

Connections of this type at the present time have several disadvantages. On the one hand they must be quite precise, and this precision greatly increases the cost of the structure. It is extremely difficult to reduce the cost and still maintain the desired precision of the connection.

It is accordingly one of the objects of the present invention to provide a connecting arrangement of the above type which is relatively simple and inexpensive and which at the same time maintains the necessary precision in the connection of a device such as a camera objective with the camera housing.

Another object of the present invention is to provide a releasable connection of the above type which is capable of reliably holding the device in its assembled condition until the operator wishes to remove the device from the structure which carries the same, so that unauthorized removal of the device by improper handling thereof or by pulling on the same is prevented.

Still another object of the present invention is to provide a connecting arrangement of the above type which requires no special tools to make the connection and disconnection and which only requires the parts to be moved with respect to each other for this purpose.

An additional object of the present invention is to provide a structure of the above type which will be subject to a relatively small amount of wear so that a long life of reliable operation is assured.

With the above objects in view, the present invention includes a releasable connecting arrangement wherein a device has a portion extending into an opening of a support means. This device engages the support means and the portion of the device which extends into the opening of the support means is provided with an annular surface which forms part of a cone. A spring ring is carried by the support means with its inner periphery in engagement with the annular surface, and the support means supports the spring ring for yieldable contraction and expansion in a plane substantially normal to the axis of the annular surface of the device, and this plane of the spring ring makes with the annular surface of the device an angle in a plane which includes the axis of the annular surface which is greater than zero but less than that angle at which the spring ring would spread upon pulling of the device from the support means.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawings, in which:

FIG. 1 is an elevational view of an objective assembly of a camera shown in cooperation with a fragmentarily and sectionally illustrated camera housing;

FIG. 2 is a sectional plan view taken along line II—II of FIG. 1 in the direction of the arrows, the objective being omitted from FIG. 2 for the sake of clarity;

FIG. 3 is a sectional elevational view taken along line III—III of FIG. 2 in the direction of the arrow;

FIG. 4 is a plan view of a ring which forms part of the assembly of FIGS. 1–3;

FIG. 5 is a fragmentary, partly sectional, elevational view of another embodiment of a releasable connecting arrangement according to the present invention; and FIG. 6 is a fragmentary partly sectional elevational view showing a third variation of a structure according to the present invention.

The invention is illustrated in the drawings as used in a camera for releasably connecting an objective assembly with the housing of the camera. In the embodiment of FIGS. 1–4 the objective assembly 4 forms the device which is releasably connected with the camera housing 1, this camera housing 1 forming a support means which is provided with an opening into which the lower portion of the assembly 4, as viewed in FIGS. 1 and 3, extends. The support means which carries the device 4 includes in addition to the member 1 a bearing means for a spring ring 7, and this bearing means includes a ring 3 which is fixed to the housing 1 by the screw members 2. The ring 3 provides the support means with an exterior annular surface 3a which is engaged by an annular surface 4' of the objective housing 4 when the latter is in the assembled condition illustrated in FIGS. 1 and 3. The bottom portion of the housing 4 extends beyond the surface 3a into the opening of the support means 1, 3. This bearing means for the spring ring 7 includes in addition to the ring 3 a ring 5 the details of which are illustrated in FIG. 4, and this ring 5 is clamped to the support means by the screws 2 between the ring 3 and the housing 1. FIG. 4 illustrates three openings spaced by 120° from each other in the ring 5 through which the three screws 2 respectively pass. The annular bearing means 3, 5 is formed between the elements 3 and 5 with an annular space 6 which receives the outer peripheral portion of the spring ring 7 which is shown most clearly in FIG. 2. The bearing means 3, 5 supports the spring ring 7 for spreading expansion and for contraction in a plane normal to the axis of the device 4 as well as for shifting movement in its entirety in the latter plane, so that the position of the entire ring 7 in this plane can be changed. As is apparent from FIG. 2, the spring ring 7 extends through almost a complete circle and has a pair of ends 7a and 7b located closely adjacent to each other.

The objective housing 4 is provided with an annular surface 4a coaxial with and axially spaced from the surface of the housing 4 which engages the annular surface 3a of the support means. This annular surface 4a is directed toward the surface of the device 4 which engages the surface 3a and forms part of a cone, as is evident from FIGS. 1 and 3. The inner periphery of the spring ring 7 engages the surface 4a, and the spring ring 7 cooperates with the surface 4a to hold the device 4 against the surface 3a of the support means, and in this way the position of the objective 4 is accurately determined, the location of the surface 3a of the support means being very precisely determined so that when the objective 4 engages this surface the objective 4 is properly positioned on the camera.

In a plane which includes the axis of the surface 4a, such as the plane of FIG. 1, the plane in which the spring ring 7 is yieldably contractible and expansible makes with the surface 4a an angle greater than zero but less than the smallest angle at which the device 4 upon being pulled from the support means is capable of spreading the spring ring 7 by the engagement of the surface 4a therewith. If the conical surface 4a is part of a cone having a small angle at the apex, a great force component will act on ring 7 in radial direction and will easily spread the ring 7 when the device 4 is pulled from the support means. On the other hand, if the surface 4a were located in a plane normal to the axis of the objective 4 then the greatest pulling force will not result in spreading of the ring 7 since no radial force would act on ring 7. Between these two extremes there is a self-locking angle within which friction prevents relative sliding of the engaging surfaces so that the surface 4a will not spread the ring 7 when the device 4 is pulled away from the support means 1, 3. The angle of the surface 4a is between zero and this self-locking angle so that the spring ring 7 and the surface 4a are self-locking and the device 4 cannot be pulled from the support means 1, 3 because the angle of the surface 4a is such that the radial component of an axial pulling force applied to the device 4 is too small to spread the ring 7 in the plane of the ring 7. This self-locking angle depends upon the coefficient of friction between the spring ring 7 and the frustoconical surface 4a, on the one hand, and the coefficient of friction between the spring ring 7 and the surface 3b of the ring 3 on the other hand, since the friction between ring 7 and surfaces 3b must be overcome when ring 7 is spread, such friction depending on the axial pulling force acting on device 4 and pressing ring 7 against surface 3b.

As long as the inclination of the surface 4a is less than this self-locking angle then self-locking takes place in the manner shown in FIG. 1 and the objective 4 is held in its assembled position not by the resilient force of the ring 7 but rather by frictional engagement between ring 7 and surface 4a. Thus, the spring ring 7 can have a relatively weak spring force and nevertheless holds the objective assembly 4 securely in its assembled position on the ring 3 even when the greatest pulling force is applied along the axis of the objective assembly 4 to the assembly 4 in a direction pulling the same away from the support means 1, 3.

It is necessary to spread the spring ring 7 by a spreader means 9 in order to remove the objective assembly 4 from the support means 1, 3. The support means 1 and the guiding and supporting ring 3 of the support means are formed with a common radial cutout 8 in which spreader means 9 is manually shiftable, and as is apparent from FIG. 2, spreader means 9 has a substantially wedge-shaped free end extending into the gap between the free ends 7a and 7b of the spring ring 7. The ring 5 has an extension formed with an elongated cutout 5a (FIG. 4) and located in the cutout 8, so that the ring 5 cannot turn about its axis with respect to the support means 1. The spreader means 9 is provided with a downwardly extending tongue 9a struck from the material of the plate 9 itself and extending into the elongated slot 5a so that the tongue 9a cooperates with the slot 5a to guide the member 9 for shifting movement back and forth along the cutout 8. The ends of the slot 5a limit the movement of the spreader means 9. When the latter is in its rest position, FIG. 2, with the objective removed from the camera, the ends 7a and 7b of the ring 7 engage the spreader means 9 and the spring ring 7 is under a predetermined prestress at this time.

In the position of the parts shown in FIG. 2 (after the objective has been removed from the camera), the tongue 9a of the spreader means 9 engages the ring 5 at the outer end of the slot 5a. As a result of the cooperation between the ends 7a and 7b of the spring ring 7 with the wedge-shaped free end of member 9, the spring ring 7 is bodily shifted away from the member 9 until the arcuate edge portion 7d of the ring 7 engages the ring 3 in the manner shown in FIG. 2. The tongue 7e of the ring 7 cooperates with the notch 3c formed in the ring 3 (FIG. 2) to prevent turning of the ring 7 about its axis while freeing the ring 7 for bodily shifting movement in its own plane which is normal to its axis.

The circular spring ring 7 is so shaped that the greatest part of its inner periphery engages the surface 4a, so that the latter is protected against localized excessive wear. Moreover, at the portions 7c of the ring 7 which are respectively adjacent the ends 7a and 7b thereof, the ring 7 is cut away at its inner periphery, so that the inner periphery of the ring 7 has the solid line rather than the dotted line configuration indicated in FIG. 2, and at these places 7c the pressure of the ring 7 against the surface 4a is the strongest when the spreader means 9 is moved inwardly toward the axis of the ring. If the portion 7c were not cut away then there would be concentrated localized wear on the surface 4a due to the concentration of the pressure of the ends of the ring 7 on the surface 4a when the spreader means 9 is manually operated to release the device 4. The configuration of the inner periphery of the ring 7 which is illustrated in FIG. 2 prevents such localized wear on the surface 4a. With this configuration the pressure from the spreader means 9 is laterally distributed along a substantial portion of the surface 4a.

The objective housing 4 is furthermore provided with an annular surface 4b which forms part of a cone and which is inclined oppositely to the surface 4a and located adjacent to the latter, as indicated in FIG. 1. The inclination of the surface 4b is such that self-locking between the surface 4b and the ring 7 cannot take place and thus when the objective 4 is inserted into the opening of the support means 1, 3 the surface 4b will engage and spread the ring 7 so that the latter snaps over the junction between the surfaces 4a and 4b and engages the surface 4a to reliably hold the objective 4 in its assembled condition.

During movement of the objective into the camera the lower portion 4b of the double cone 4a, 4b cooperates with the inner beveled periphery 7f of the ring 7 to spread the latter until it snaps over onto the conical surface portion 4a. At the beginning of this engagement of surface 4b with surface 7f the arcuate portion 7d still engages the ring 3 while the end portions 7a and 7b are spread apart from each other out of engagement with the wedge-shaped free end of the spreader means 9. After the largest diameter of the double cone has moved through the ring 7 so that the latter engages the surfaces 4a, this ring 7 due to its own resiliency closes itself upon the surface 4a during further movement of the objective into the camera and adapts itself to the diameter of the portion of surface 4a by ring 7 when the objective is in its final position shown in FIGS. 1 and 3. It is apparent that the ring 7 is resiliently closing itself upon the surface 4a centers itself with respect to the surface 4a and shifts itself bodily away from the notch 3c of the ring 3 in its own plane perpendicular to its own axis. The diameter of the surface 4a which is engaged by the ring 7 in the final position of the objective shown in FIGS. 1 and 3 is of such a size that in this position the free ends 7a and 7b of the ring 7 are held by the surface 4a spaced from the wedge-shape end of the member 9.

When the latter is manually moved toward the optical axis to release the objective it first engages the free ends 7a and 7b of the ring 7, then bodily shifts the latter toward the notch 3c until the edge portion 7d engages the ring 3, and then during further inward movement of the spreader means 9 the ring 7 is spread to an extent sufficient to release the objective so that the latter can be removed from the camera.

It is desirable to prevent the objective assembly 4 from being turned about its axis, and for this purpose the ring 5 is formed with an arcuate slot 5c (FIG. 4) which serves to provide the ring 5 with an inner peripheral portion 5d which is yieldable in a direction normal to the plane of the ring 5 and which is provided with a radial extension 5b extending toward the center of the ring 5. When the objective assembly 4 is introduced into the opening of the support means 1, 3 the rear end 4c of the objective assembly 4 engages the tongue 5b and urges the same out of the plane of the ring 5. With the edge 4c engaging the extension 5b the assembly 4 is turned about its axis until the extension 5b snaps into a notch 4d (FIG. 3) formed in the objective assembly 4 and extending from the end 4c thereof, as indicated in FIG. 3. The yieldability of the portion 5d of the ring 5 causes the extension 5b to snap into the notch 4d, and with the tongue 5b located in the notch 4d the objective assembly 4 can no longer turn about its axis. This structure for preventing turning of the objective assembly 4 is desirable so as to guarantee that scales on the exterior of the objective assembly are properly positioned so as to be visible to the operator, and furthermore with this structure the objective assembly 4 cannot be removed from the housing 1, 3 by a combined rotary and pulling force.

FIG. 5 illustrates a further embodiment of a structure according to the present invention. The release of the connection by means of a rotary pulling force is prevented by this embodiment in advance. Also, with the embodiment of FIG. 5 it is possible to adjust the axial position of the spring ring 7 with respect to the frustoconical surface 4a so that the place of engagement between the inner periphery of the spring ring 7 and the surface 4a is capable of being regulated.

Referring to FIG. 5, it will be seen that the support means 1 carries three screw members 11 one of which is illustrated in FIG. 5. The screw members 11 are spaced from each other by 120° and are distributed about the axis of the objective assembly 4. The screw members 11 extend parallel to the axis of the objective assembly 4 and because of their threaded connection with the support means 1 the screw members 11 are capable of being axially adjusted. At their ends which are directed toward the objective assembly 4 the three screw members 11 are respectively formed with conical recesses, and the objective assembly 4 is provided with three pins 4e fixed to the objective assembly 4 and extending therefrom respectively toward the screw members 11, these pins 4e respectively having rounded ends extending into the conical recesses of the screw members 11, one of the pins 4e being shown in FIG. 5 extending into the conical recesses of the screw members 11. By turning the screw members 11 with respect to the support means 1 it is possible on the one hand to regulate the distance between the objective 4 and the film plane in which the film is located when an exposure is made and on the other hand it is possible to adjust the direction in which the axis of the objective assembly 4 extends.

The embodiment of FIG. 5 is also provided with a bearing means for the spring ring 7, and in this embodiment the bearing means is made up of the pair of rings 12 and 13. The axial space between the coaxial rings 12 and 13 is determined by a plurality of tongues 12a struck from the ring 12 and extending from and engaging the ring 13 so that the rings 12 and 13 define between themselves an annular space corresponding to the space 6 of FIGS. 1 and 3 and in which the outer peripheral portion of the spring ring 7 is located. The rings 12 and 13 are respectively formed with three pairs of aligned openings 12b and 13a through which the pins 4e respectively extend into engagement with screw members 11. The three screw members 11 are provided with collars 11a, respectively, and a springy ring 14 is formed with openings into which the screw members 11 respectively extend, and this ring 14 engages the collar 11a and is of a wavy, corrugated configuration, the springy ring 14 engaging the collars 11a on the one hand and the ring 12 on the other hand so as to resiliently urge the latter away from the collars 11a. An annular cap nut 15 is in threaded engagement with the support means 1 and has an inner periphery engaging a cylindrical flange located at the periphery of the ring 13, as indicated in FIG. 5, so that by turning the ring 15 it is possible to move the bearing means 12, 13 together with the spring ring 7 against the force of the springy ring 14 toward the collars 11a, and of course it is also possible to turn the ring 15 so that the bearing means 12, 13 moves in the opposite axial direction, and in this way the axial position of the spring ring 7 is adjusted. The ring 15 is provided at its outer surface with a plurality of axially extending grooves 15a, and a springy member 16 is fixed to the support means 1 and snaps into a desired one of the grooves 15a so as to releasably maintain the ring 15 in its adjusted annular position.

With the embodiment of FIG. 5 the frustoconical surface 4a cooperates with the spring ring 7 the same way as with the embodiment of FIGS. 1–4 so that the cooperation is such that a pull on the objective assembly 4 is incapable of causing the surface 4a to spread the ring 7. On the other hand the surface 4b is capable of spreading the ring 7 when the objective assembly 4 is inserted into the opening of the support means 1 so that in this way it is very easy to assemble the aparatus. The spring ring 7 of FIG. 5 is also provided with a pair of free ends defining between themselves a gap into which a spreading means 9 identical with that described above extends, so that in this way it is impossible to release the connection between the devices 1 and 4.

FIG. 6 of the drawings shows an embodiment identical with that of FIGS. 1–3 except that the plate 5 of FIG. 4 is omitted and the objective assembly 4 is not provided with a notch 4d, so that it is possible to turn the objective assembly 4 about its axis. However, in order to prevent the self-locking action between the spring ring 7 and the surface 4a from failing to operate to maintain the objective assembly 4 in its assembled condition even if a rotary pulling force is applied to the objective assembly, the ring 17 which forms together with the housing 1 a bearing means for the ring 7 in the embodiment of FIG. 6 is provided at its inner surface which engages the top face of the ring 7, as viewed in FIG. 6, with a shoulder 17a surrounding the ring 7 and inclined in substantially the same direction as the annular surface 4a. When a rotary pulling force is applied to the objective assembly 4 of FIG. 6, it is possible that the ring 7 might spread somewhat, but it will only spread until the outer periphery thereof engages the shoulder 17a, and the added friction produced by the cooperation of the shoulder 17a with the ring 7 will prevent the latter from spreading further irrespective of the size of the rotary pulling force, so that in this way the security of the connection of the embodiment of FIG. 6 is assured. The pressure of the outer periphery of the ring 7 against the shoulder 17a produces a self-locking action which prevents further spreading of the ring 7. However, when the spreader means 9, which is the same in the embodiment of FIG. 6 as that of FIG. 1, is manually operated to spread the ring 7, the shoulder 17a does not prevent spreading of the ring 7 and it is thus possible to easily release the device 4 from the support means 1 with the spreader means 9. The shoulder 17a does not prevent spreading of the ring 7 by the spreader means 9 because at this time the pressure acts only in a radial direction.

Thus, it will be seen that with the above-described embodiments of the invention advantage is taken of the fact that the angle of the surface 4a is in the self-locking range, to provide a spring ring 7 which does not rely upon its spring force for holding the objective assembly 4 in its assembled condition, and thus the spring force can be quite small and the undesirable forces applied to the surface 4a by a spring ring which resiliently presses against the same are avoided and thus the surface 4a will not become undesirably deformed after a short period of time.

It will be understood that each of the elements described above, or two or more together, may also find a useful application in other types of releasable connecting arrangements differing from the types described above.

While the invention has been illustrated and described as embodied in releasable connecting arrangements for cameras or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the means and range of equivalence of the following claims.

What is claimed as new and desired to be secured by Letters Patent is:

1. A releasable connecting arrangement comprising, in combination, a device having a portion extending from a first annular surface which surrounds said portion at one end thereof, and said portion of said device being provided with a second annular surface which forms part of a cone, which is spaced coaxially from said first annular surface, and which is directed toward said first annular surface; support means formed with an opening receiving said portion of said device and having an annular surface engaging said first annular surface of said device when the latter is connected with said support means; and an annular spring ring surrounding and resiliently pressing at its inner periphery against said second annular surface of said device and being supported in said support means for movement in a plane normal to the axis of said first and second annular surfaces while being prevented from moving in a direction parallel to said axis, said second annular surface forming with the plane of said spring ring in a plane which includes the common axis of said first and second annular surfaces such an angle as to obtain a self-locking engagement between said spring ring and said second annular surface, said angle being greater than zero but smaller than the angle at which self-locking ceases so that it is not possible to expand the spring ring by pulling the device outwardly away from said support means whereby on the one hand said spring ring has a substantially circumferential engagement with said second annular surface and urges said first annular surface against said annular surface of said support means and on the other hand said spring ring must be expanded before the device can be moved outwardly away from said support means.

2. A releasable connecting arrangement comprising, in combination, a device having a portion extending from a first annular surface which surrounds said portion at one end thereof, and said portion of said device being provided with a second annular surface which forms part of a cone, which is spacd coaxially from said first annular surface, and which is directed toward said first annular surface; support means formed with an opening receiving said portion of said device and having an annular surface engaging said first annular surface of said device when the latter is connected with said support means; an annular spring ring surrounding and resiliently pressing at its inner periphery against said second annular surface of said device and being supported in said support means for movement in a plane normal to the axis of said first and second annular surfaces while being prevented from moving in a direction parallel to said axis, said second annular surface forming with the plane of said spring ring in a plane which includes the common axis of said first and second annular surfaces such an angle as to obtain a self-locking engagement between said spring ring and said second annular surface, said angle being greater than zero but smaller than the angle at which self-locking ceases so that it is not possible to expand the spring ring by pulling the device outwardly away from said support means; and manually operable spreading means carried by said support means and cooperating with said spring ring for spreading the latter to release said device for movement away from said support means whereby on the one hand said spring ring has a substantially circumferential engagement with said second annular surface and urges said first annular surface against said annular surface of said support means and on the other hand said spring ring must be expanded before the device can be moved outwardly away from said support means.

3. A releasable connecting arrangement comprising, in combination, a device having a portion extending from a first annular surface which surrounds said portion at one end thereof, and said portion of said device being provided with a second annular surface which forms part of a cone, which is spaced coaxially from said first annular surface, and which is directed toward said first annular surface; support means formed with an opening which receives said portion of said device and having an annular surface engaging said first annular surface of said device when the latter is assembled with said support means; and a spring ring hoving an inner periphery engaging said second annular surface of said portion of said device and supported by said support meas for yieldable resilient movement in a plane substantially normal to the common axis of said first and second annular surfaces while being substantially prevented by said support means from moving along said common axis, said spring ring being located in a plane which makes with said second annular surface in a plane including said common axis of said first and second annular surfaces an angle greater than zero but less than that angle at which said spring ring could be spread upon pulling of said device outwardly away from said support means, said spring ring having a pair of free ends located closely adjacent to each other and being cut away at its inner periphery adjacent said free ends so that when pressure is applied to the ends of said spring ring for spreading the latter the pressure is not concentrated on said second annular surface at the region of said ends of said spring ring, whereby on the one hand said spring ring has a substantially circumferential engagement with said second annular surface and urges said first annular surface against said annular surface of said support means and on the other hand said spring ring must be expanded before the device can be moved outwardly away from said support means.

4. A releasable connecting arrangement comprising, in combination, a device having a portion extending from a first annular surface which surrounds said portion at one end thereof, and said portion of said device being provided with a second annular surface which forms part of a cone, which is spaced coaxially from said first annular surface, and which is directed toward said first annular surface; support means formed with an opening receiving said portion of said device and having an annular surface engaging said first annular surface of said device when the latter is connected with said support means; and an annular spring ring surrounding and engaging at its inner periphery said second annular surface of said device and being supported in said support means for movement in a plane normal to the axis of said first and second annular surfaces while being prevented from moving in a direction parallel to said axis, said second annular surface forming with the plane of said spring ring in a plane which includes the common axis of said first and second annular surfaces an angle which is gretater than zero but less than that angle at which it is possible to expand the spring ring by pulling the device outwardly away from said support means, said support means having a surface directed away from said first annular surface of said device and engaging one face of said spring ring, and said support means having at its surface which engages said face of said spring ring an inclined annular shoulder surrounding said spring ring for preventing spreading thereof to an extent which permits the device to be removed from said support means until a suitable spreading means is applied to said spring ring whereby on the one hand said spring ring has a substantially circumferential engagement with said second annular surface and urges said first annular surface against said annular surface of said support means and on the other hand said spring ring must be expanded before the device can be moved outwardly away from said support means.

5. A releasable connecting arrangement comprising, in combination, a device having a portion extending from a first annular surface which surrounds said portion at one end thereof, and said portion of said device being provided with a second annular surface which forms part of a cone, which is spaced coaxially from said first annular surface, and which is directed toward said first annular surface; support means formed with an opening receiving said portion of said device and having an annular surface engaging said first annular surface of said device when the latter is connected with said support means; an annular spring ring surrounding and engaging at its inner periphery said second annular surface of said device and being supported in said support means for movement in a plane normal to the axis of said first and second annular surfaces while being prevented from moving in a direction parallel to said axis, said second annular surface forming with the plane of said spring ring in a plane which includes the common axis of said first and second annular surfaces an angle which is greater than zero but less than that angle at which it is possible to expand the spring ring by pulling the device outwardly away from said support means; and means cooperating with said support means and said device for preventing relative rotation between said support means and said device about the common axis of said annular surfaces of said portion of said device whereby on the one hand said spring ring has a substantially circumferential engagement with said second annular surface and urges said first annular surface against said annular surface of said support means and on the other hand said spring ring must be expanded before the device can be moved outwardly away from said support means.

6. A releasable connecting arrangement comprising, in combination, a device having a portion extending from a first annular surface which surrounds said portion at one end thereof, and said portion of said device being provided with a second annular surface which forms part of a cone, which is spaced coaxially from said first annular surface, and which is directed toward said first annular surface; support means formed with an opening receiving said portion of said device; an annular spring ring surrounding and engaging at its inner periphery said second annular surface of said device and being supported in said support means for movement in a plane normal to the axis of said first and second annular surfaces while being prevented from moving in a direction parallel to said axis, said second annular surface forming with the plane of said spring ring in a plane which includes the common axis of said first and second annular surfaces an angle which is greater than zero but less than that angle at which it is possible to expand the spring ring by pulling the device outwardly away from said support means; and adjusting means for adjusting the position of said spring ring along said common axis of said first and second annular surfaces so that the place where said spring ring engages said second annular surface may be adjusted whereby on the one hand said spring ring has a substantially circumferential engagement with said second annular surface and urges said first annular surface against said annular surface of said support means and on the other hand said spring ring must be expanded before the device can be moved outwardly away from said support means.

7. A releasable connecting arrangement comprising, in combination, support means formed with an opening; a device engaging said support means and having a portion extending into said opening thereof and provided with an annular surface forming part of a cone and directed toward the exterior of said support means; a spring ring engaging at its inner periphery said annular surface of said portion of said device; bearing means located in said opening of said support means and supporting said spring ring for yieldable spreading and contracting movement in a plane normal to the axis of said annular surface, said plane and said annular surface forming, with each other in a plane including said axis of said annular surface such an angle as to obtain a self-locking engagement between said ring and said annular surface, said angle being less than that angle at which the device upon being pulled from said support means will produce spreading of said spring ring by cooperation of said annular surface therewith.

8. The combination comprising, in combination, a device having a portion extending from a first annular surface which surrounds said portion at one end thereof, and said portion of said device being provided with a second annular surface which forms part of a cone, which is spaced coaxially from said first annular surface, and which is directed toward said first annular surface; support means formed with an opening receiving said portion of said device and having an annular surface engaging said first annular surface of said device when the latter is connected with said support means; and an annular spring ring surrounding and resiliently pressing at its inner periphery against said second annular surface of said device and being supported in said support means for movement in a plane normal to the axis of said first and second annular surfaces while being prevented from moving in a direction parallel to said axis, whereby said spring ring has a substantially circumferential engagement with said second annular surface and urges said first annular surface against said annular surface of said support means.

9. A releasable connecting arrangement comprising, in combination, a device having a portion extending from a first annular surface which surrounds said portion at one end thereof, and said portion of said device being provided with a second annular surface which forms part of a cone, which is spaced coaxially from said first annular surface, and which is directed toward said first annular surface; support means formed with an opening receiving said portion of said device and having an annular surface engaging said first annular surface of said device when the latter is connected with said support means; an annular spring ring surrounding and resiliently pressing at its inner periphery against said second annular surface of said device and being supported in said support means for movement in a plane normal to the axis of said first and second annular surfaces while being prevented from moving in a direction parallel to said axis; and manually operable spreading means carried by said support means and cooperating with said spring ring for spreading the latter to release said device for movement away from said support means, whereby said spring ring has a substantially circumferential engagement with said second annular surface and urges said first annular surface against said annular surface of said support means.

10. A releasable connecting arrangement comprising, in combination, a device having a portion extending from a first annular surface which surrounds said portion at one end thereof, and said portion of said device being provided with a second annular surface which forms part of a cone, which is spaced coaxially from said first annular surface, and which is directed toward said first annular surface; support means formed with an opening which receives said portion of said device and having an annular surface engaging said first annular surface of said device when the latter is assembled with said support means; and a spring ring having an inner periphery engaging said second annular surface of said portion of said device and supported by said support means for yieldable resilient movement in a plane substantially normal to the common axis of said first and second annular surfaces while being substantially prevented by said support means from moving along said common axis, said spring ring having a pair of free ends located closely adjacent to each other and being cut away at its inner periphery adjacent said free ends so that when pressure is applied to the ends of said spring means for spreading the latter the pressure is not concentrated on said second annular surface at the region of said spring ring, whereby said spring ring has a substantially circumferential engagement with said second annular surface and urges said first annular surface against said annular surface of said support means.

11. A releasable connecting arrangement comprising, in combination, a device having a portion extending from a first annular surface which surrounds said portion at one end thereof, and said portion of said device being provided with a second annular surface which forms part of a cone, which is spaced coaxially from said first annular surface, and which is directed toward said first annular surface; support means formed with an opening receiving said portion of said device and having an annular surface engaging said first annular surface of said device when the latter is connected with said support means; and an annular spring ring surrounding and engaging at its inner periphery said annular surface of said device and being supported in said support means for movement in a plane normal to the axis of said first and second annular surfaces while being prevented from moving in a direction parallel to said axis, said support means having a surface directed away from said first annular surface of said device and engaging one edge of said spring ring, and said support means having at its surface which engages said face of said spring ring and inclined annular shoulder surrounding said spring ring for preventing spreading thereof to an extent which permits the device to be removed from said support means until a suitable spreading means is applied to said spring ring, whereby said spring ring has a substantially circumferential engagement with said second annular surface and urges said first annular surface against said first annular surface of said support means.

12. The combination comprising, in combination, a device having a portion extending from a first annular surface which surrounds said portion at one end thereof, and said portion of said device being provided with a second annular surface which forms part of a cone, which is spaced coaxially from said first annular surface, and which is directed toward said first annular surface; support means formed with an opening receiving said portion of said device and having an annular surface engaging said first annular surface of said device when the latter is connected with said support means; and an annular spring ring surrounding and engaging at its inner periphery said second annular surface of said device and being supported in said support means for movement in a plane normal to the axis of said first and second annular surfaces while being prevented from moving in a direction parallel to said axis; and means cooperating with said support means and said device for preventing relative rotation between said support means and said device about the common axis of said annular surfaces of said portion of said device, whereby said spring ring has a substantially circumferential engagement with said second annular surface and urges said first annular surface against said annular surface of said support means.

13. A releasable connecting arrangement, comprising, in combination, a device having a portion extending from a first annular surface which surrounds said portion at one end thereof, and said portion of said device being provided with a second annular surface which forms part of a cone, which is spaced coaxially from said first annular surface, and which is directed toward said first annular surface; support means formed with an opening receiving said portion of said device; an annular spring ring surrounding and engaging at its inner periphery said second annular surface of said device and being supported in said support means for movement in a plane normal to the axis of said first and second annular surfaces while being prevented from moving in a direction parallel to said axis; and adjusting means for adjusting the position of said spring ring along said common axis of said first and second annular surfaces so that place where said spring ring engages said second annular surface may be adjusted, whereby said spring ring has a substantially circumferential engagement with said second annular surface and urges said first annular surface against said annular surface of said support means.

References Cited in the file of this patent

UNITED STATES PATENTS

| 658,911 | Hall | Oct. 2, 1900 |
| 1,407,570 | Peirce | Feb. 21, 1922 |
| 2,363,436 | Pancoe | Nov. 21, 1944 |
| 2,793,869 | Braun | May 28, 1957 |
| 2,895,754 | Wuzel | July 21, 1959 |

FOREIGN PATENTS

| 350,027 | Germany | Mar. 11, 1922 |
| 597,385 | Germany | May 25, 1934 |